(12) United States Patent
Kao et al.

(10) Patent No.: US 10,809,572 B2
(45) Date of Patent: Oct. 20, 2020

(54) DISPLAY DEVICE

(71) Applicant: Innolux Corporation, Miao-Li County (TW)

(72) Inventors: Chen-Kuan Kao, Miao-Li County (TW); Ching-Che Yang, Miao-Li County (TW); Chung-Jun Kuo, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

(21) Appl. No.: 15/984,513

(22) Filed: May 21, 2018

(65) Prior Publication Data

US 2018/0364506 A1 Dec. 20, 2018

(30) Foreign Application Priority Data

Jun. 15, 2017 (TW) .............................. 106119924 A

(51) Int. Cl.
*G02F 1/1339* (2006.01)
*G02F 1/1337* (2006.01)
(Continued)

(52) U.S. Cl.
CPC .......... *G02F 1/1337* (2013.01); *G02F 1/1339* (2013.01); *G02F 1/13394* (2013.01);
(Continued)

(58) Field of Classification Search
CPC ......... G02F 1/1337; G02F 2001/13396; G02F 2001/133388; G02F 1/1339
See application file for complete search history.

(56) References Cited

U.S. PATENT DOCUMENTS

| 7,892,709 B2 | 2/2011 | Lai et al. |
| 2009/0009697 A1* | 1/2009 | Tsuji ................. G02B 5/201 349/106 |

(Continued)

FOREIGN PATENT DOCUMENTS

| JP | 2014211592 A | 11/2014 |
| TW | 200809270 A | 2/2008 |

OTHER PUBLICATIONS

TW Office Action dated Jan. 18, 2018 in corresponding Taiwan application (No. 106119924).
(Continued)

*Primary Examiner* — Michael H Caley
*Assistant Examiner* — Mariam Qureshi
(74) *Attorney, Agent, or Firm* — McClure, Qualey & Rodack, LLP

(57) ABSTRACT

A display device including a first substrate, a color filter, a first electrode layer, a first alignment layer, a second substrate, and a display layer is provided. An interface is between the display region and the border region of the first substrate. The color filter is disposed corresponding to the display region and includes a plurality of first pixel regions and second pixel regions arranged staggeredly. The first alignment layer corresponding to a first one of the first pixel regions counting from the interface towards the display region has a first thickness T1, the first alignment layer corresponding to a fourth one of the first pixel regions counting from the interface towards the display region has a second thickness T2, and the first thickness T1 and the second thickness T2 in units of micrometers (μm) are conformed to the following condition: $0.8 \leq T1/T2 \leq 1.2$.

18 Claims, 3 Drawing Sheets

(51) Int. Cl.
G02F 1/1335 (2006.01)
G02F 1/1343 (2006.01)
G02F 1/1333 (2006.01)

(52) U.S. Cl.
CPC .. G02F 1/133514 (2013.01); G02F 1/133711 (2013.01); G02F 1/133723 (2013.01); G02F 1/134309 (2013.01); G02F 2001/13396 (2013.01); G02F 2001/13398 (2013.01); G02F 2001/133388 (2013.01); G02F 2201/121 (2013.01); G02F 2201/123 (2013.01); G02F 2201/48 (2013.01)

(56) References Cited

U.S. PATENT DOCUMENTS

| | | | |
|---|---|---|---|
| 2012/0194494 A1* | 8/2012 | Jung | G02F 1/133723 345/208 |
| 2016/0124255 A1* | 5/2016 | Kida | G02F 1/1337 348/791 |
| 2017/0038636 A1* | 2/2017 | Yu | G02F 1/133514 |
| 2018/0307078 A1* | 10/2018 | Liu | G02F 1/13394 |

OTHER PUBLICATIONS

EPO Search Report dated Oct. 11, 2018 in EP Application (No. 18176477.0-1210).
EPO Search Report dated Jul. 25, 2018 in EP Application (No. 18176477.0-1210).

* cited by examiner

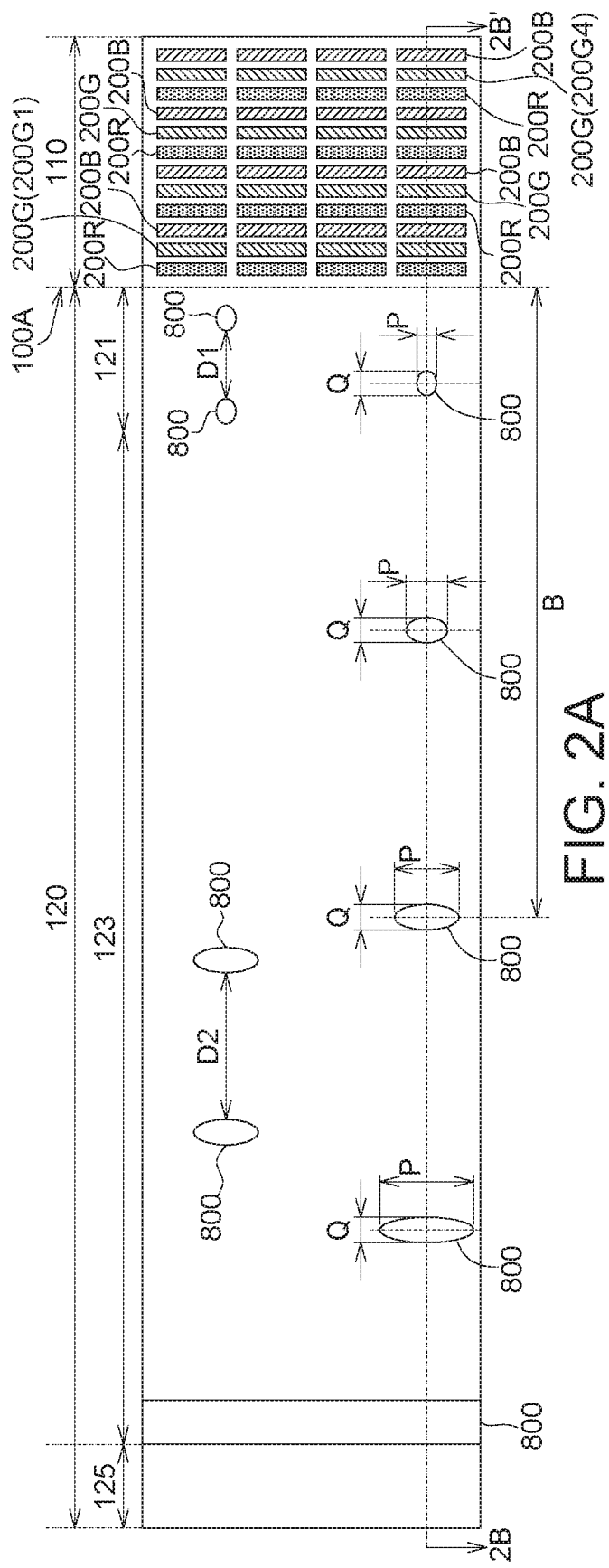
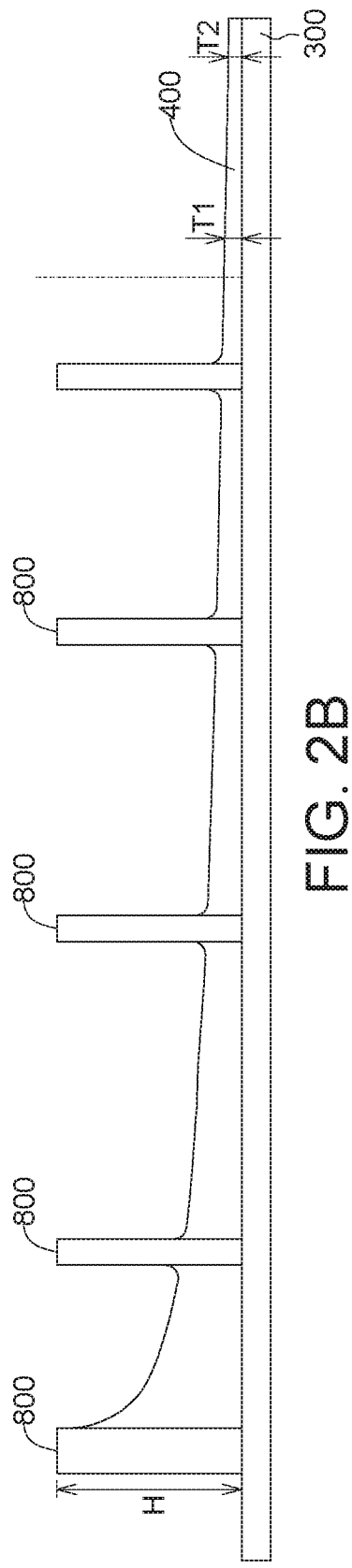
FIG. 2A
FIG. 2B

DISPLAY DEVICE

This application claims the benefit of Taiwan application Serial No. 106119924, filed Jun. 15, 2017, the subject matter of which is incorporated herein by reference.

TECHNICAL FIELD

The present disclosure relates to a display device, and particularly to a display device including an alignment layer.

BACKGROUND

The alignment layers in liquid crystal displays are usually manufactured by wet coating processes, such as a flexographic printing process or an ink-jet printing process. In the flexographic printing process, the coating solution is printed on the to-be-coated surfaces by roller coating, and in the ink-jet printing process, the coating solution is sprayed onto the to-be-coated surfaces through spraying holes.

However, when the quality of the alignment layers is unsatisfactory, it may result in having undesired influences on the display qualities of the displays. Therefore, these are needs to provide alignment layers with excellent qualities to solve the problems that the conventional technique is facing.

SUMMARY

The present disclosure relates to a display device. In the embodiment, in the display device, the variance between the thickness of the first alignment layer corresponding to a first one of the first pixel regions and the thickness of the first alignment layer corresponding to the fourth one of the first pixel regions counting from the interface towards the display region between the display region and the border region is greater than 0% and equal to or less than 20% indicating that the thickness of the first alignment layer is provided with excellent uniformity, such that the occurrence of mura can be reduced, and the display quality of the display device can be increased.

According to an embodiment of the present disclosure, a display device is provided. The display device includes a first substrate, a color filter, a first electrode layer, a first alignment layer, a second substrate and a display layer. The first substrate has a display region and a border region, and an interface is between the display region and the border region. The color filter is disposed corresponding to the display region of the first substrate. The color filter includes a plurality of first pixel regions and a plurality of second pixel regions arranged staggeredly, and the first pixel regions and the second pixel regions are pixel regions with different colors. The first electrode layer is disposed on the first substrate, and the first alignment layer is disposed on the first electrode layer. The first alignment layer corresponding to a first one of the plurality of the first pixel regions counting from the interface towards the display region has a first thickness T1, the first alignment layer corresponding to a fourth one of the plurality of the first pixel regions counting from the interface towards the display region has a second thickness T2. The units of the first thickness T1 and the second thickness T2 are micrometers (μm), and the first thickness T1 and the second thickness T2 are conformed to the following condition: $0.8 \leq T1/T2 \leq 1.2$. The display layer is disposed between the first substrate and the second substrate.

The following description is made with reference to the accompanying drawings and embodiments.

BRIEF DESCRIPTION OF THE DRAWINGS

FIG. 2A shows a partial top view of a display device according to an embodiment of the present disclosure; and FIG. 2B shows a cross-sectional view along the cross-sectional line 2B-2B' in FIG. 2A.

DETAILED DESCRIPTION

Figure 1A:
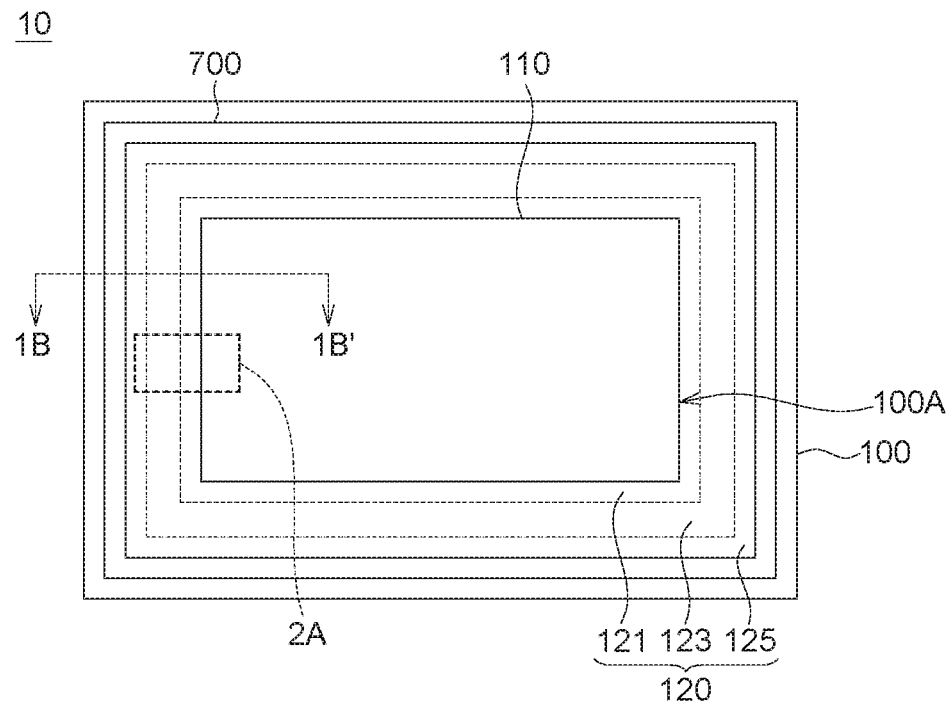
FIG. 1A shows a top view of a display device according to an embodiment of the present disclosure.

The following description of the embodiments of the present disclosure is made with reference to the accompanying drawings. The embodiments are for exemplification and not for limiting the scope. In the embodiments, the elements sharing similar or the same labels in the drawings are similar or the same elements. The present disclosure can be realized by applying various features, methods and parameters. The detailed structures disclosed in the embodiments are for exemplification only, not for limiting the scope of protection of the disclosure. One of ordinary skills in the art may modify or change the structures according to actual needs. In addition, it is to be noted that the accompanying drawings are simplified with some secondary elements omitted for clearly describing the disclosure.

Figure 1B:
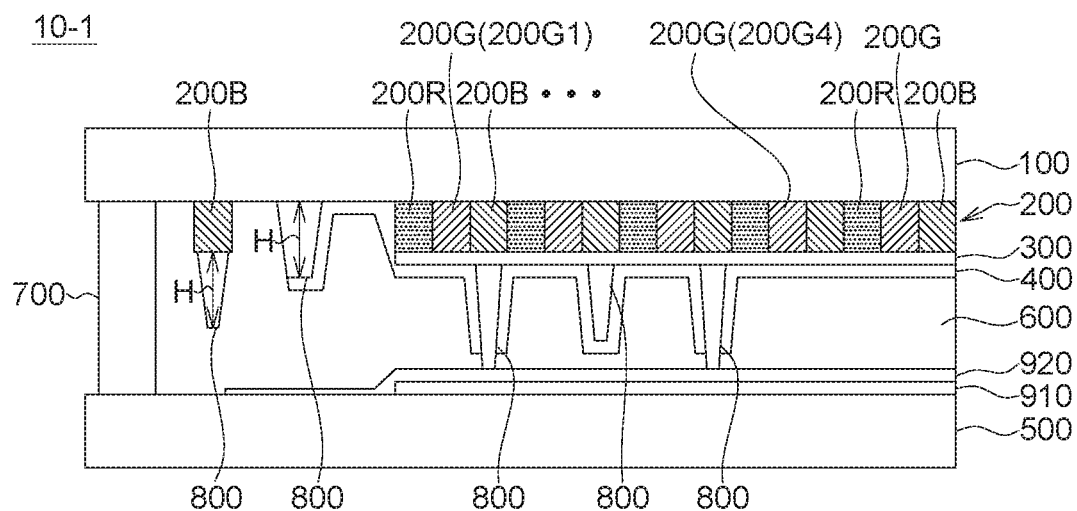
FIG. 1B to FIG. 1D show cross-sectional views along the cross-sectional line 1B-1B' in FIG. 1A according to some embodiments of the present disclosure.
Figure 1C:
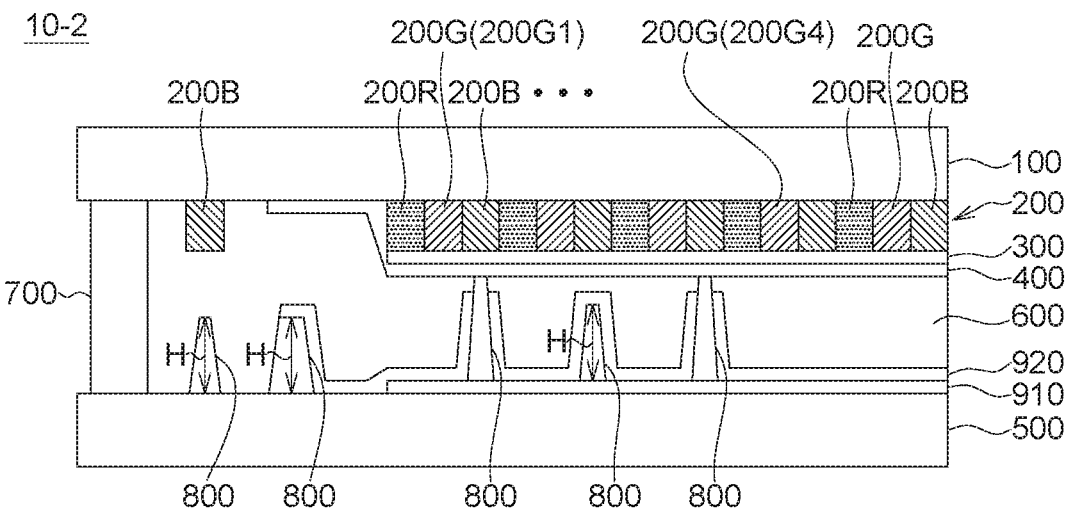
Figure 1D:
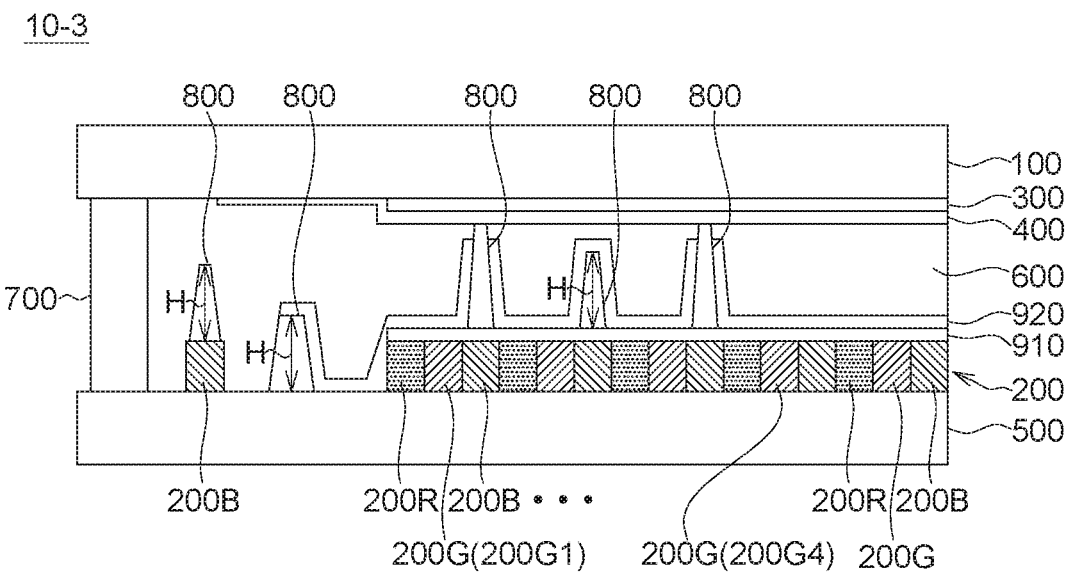
Figure 1E:
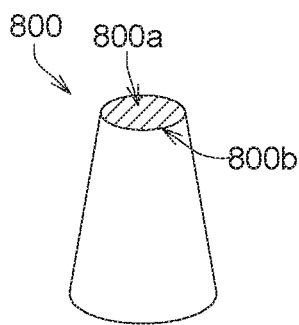
FIG. 1E shows a 3D diagram of a spacer according to an embodiment of the present disclosure.

FIG. 1A shows a top view of a display device according to an embodiment of the present disclosure, FIG. 1B to FIG. 1D show cross-sectional views along the cross-sectional line 1B-1B' in FIG. 1A according to some embodiments of the present disclosure, FIG. 1E shows a 3D diagram of a spacer according to an embodiment of the present disclosure, FIG. 2A shows a partial top view of a display device according to an embodiment of the present disclosure, and FIG. 2B shows a cross-sectional view along the cross-sectional line 2B-2B' in FIG. 2A. FIG. 2A is the top view f the region 2A in FIG. 1A. It is to be noted that some elements are omitted for clearly describing the present disclosure. It is also important to point out that some elements in drawings may not be necessarily drawn to scale; thus, the specification and the drawings are to be regarded as an illustrative sense rather than a restrictive sense.

As shown in FIGS. 1A-1D and 2A-2B, the display device 10, as well as the display device 10-1, the display device 10-2 and the display device 10-3, includes a first substrate 100, a color filter 200, a first electrode layer 300, a first alignment layer 400, a second substrate 500 and a display layer 600. The first substrate 100 has a display region 110 and a border region 120. As viewed from the top view perspective, the color filter 200 is disposed corresponding to the display region 110 of the first substrate 100, the color filter 200 includes a plurality of first pixel regions and a plurality of second pixel regions arranged staggeredly, and the first pixel regions and the second pixel regions are pixel regions with different colors. In some embodiments, the first pixel regions are such as green pixel regions 200G, and the second pixel regions are such as red pixel regions 200R and/or blue pixel regions 200B. In the present embodiment the color filter 200 includes a plurality of red pixel regions 200R, a plurality of green pixel regions 200G and a plurality of blue pixel regions 200B which are arranged staggeredly and adjacent to one another. In some other embodiments, the color filter 200 may include a plurality of red pixel regions 200R and a plurality of green pixel region 200G arranged staggeredly, or a plurality of green pixel regions 200G and a plurality of blue pixel regions 200B arranged staggeredly, or a plurality of red pixel regions 200R and a plurality of blue pixel regions 200B arranged staggeredly. In some further embodiments, the color filter 200 may include a plurality of red pixel regions 200R, a plurality of green pixel regions 200G, a plurality of blue pixel regions 200B and a plurality of white pixel regions (i.e. transparent pixel regions) arranged staggeredly; or, the color filter 200 may include a plurality of red pixel regions 200R, a plurality of green pixel regions 200G, a plurality of blue pixel regions 200B and a plurality of yellow pixel regions; the present disclosure is not limited thereto. The first electrode layer 300 is disposed on the first substrate 100, and the first alignment layer 400 is disposed on the first electrode layer 300. The display layer 600 is disposed between the first substrate 100 and the second substrate 500.

In the present embodiment, as shown in FIG. 2A, the red pixel regions 200R, the green pixel regions 200G and the blue pixel regions 200B in the display region 110 are arranged repeatedly and sequentially, where one red pixel region 200R, one green pixel region 200G and one blue pixel region 200B form a pixel, and multiple pixels are arranged as a matrix. In the display region 110, i.e. non-border region, one red pixel region 200R is arranged adjacent to one green pixel region 200G and one blue pixel region 200B, one green pixel region 200G is arranged adjacent to one red pixel region 200R and one blue pixel region 200B, and one blue pixel region 200B is arranged adjacent to one green pixel region 200G and one red pixel region 200R.

According to the embodiments of the present disclosure, as shown in FIG. 2A, an interface 100A is located between the display region 110 and the border region 120. In some embodiments, the two portions of the first alignment layer 400 respectively corresponding to the display region 110 and the border region 120 could have different thicknesses. For example, in the present embodiment, the portion of the first alignment layer 400 corresponding to the display region 110 has a thickness substantially less than that of the portion of the first alignment layer 400 corresponding to the border region 120. The first alignment layer 400 corresponding to (located above or below) a first one of the plurality of the first pixel regions counting from the interface 100A towards the display region 110 has a first thickness T1, the first alignment layer 400 corresponding to (located above or below) the fourth one of the plurality of the first pixel regions counting from the interface 100A towards the display region 110 has a second thickness T2, the first thickness T1 and the second thickness T2 are in units of micrometers (μm), and the values of the first thickness T1 and the second thickness T2 satisfy the following condition: $0.8 \leq T1/T2 \leq 1.2$. For example, in the present embodiment, as shown in FIG. 2A. The first alignment layer 400 corresponding to (located above or below) the first green pixel region 200G (200G1) of the plurality of the green pixel regions 200B counting from the interface 100A towards the display region 110 has a first thickness T1, the first alignment layer 400 corresponding to (located above or below) the fourth green pixel region 200G (200G4) of the plurality of the green pixel regions 200G counting from the interface 100A towards the display region 110 has a second thickness T2, the first thickness T1 and the second thickness T2 are in units of micrometers (μm), and the values of the first thickness T1 and the second thickness T2 satisfy the following condition: $0.8 \leq T1/T2 \leq 1.2$, $T1/2 \neq 1$. In other words, the variance between the thickness of the first alignment layer 400 corresponding to the first green pixel region 200G1 and the thickness of the first alignment layer 400 corresponding to the fourth green pixel region 200G4 counting from the interface 100A towards the display region 110 is greater than 0% and equal to or less than 20%. That is, the first thickness T1 is different from the second thickness T2. In some embodiments, the distance between the interface 100A and the green pixel region 200G1 of the first pixel is such as about 50 μm, and the distance between the interface 100A and the green pixel region 200G4 of the fourth pixel is such as about 1000 μm. In other embodiments, the variance between the thicknesses of the first alignment layer corresponding to the first pixel region and the fourth pixel region of different colors is also greater than 0% and equal to or less than 20%.

According to the embodiments of the present disclosure, the variance between the thickness of the first alignment layer 400 corresponding to the first pixel region (e.g. the green pixel region 200G1) of the plurality of the first pixel regions and the thickness of the first alignment layer 400 corresponding to the fourth pixel region (e.g. the green pixel region 200G4) of the plurality of the first pixel regions counting from the interface 100A towards the display region 110 is greater than 0% and equal to or less than 20%, indicating that the thickness of the first alignment layer 400 is provided with excellent uniformity, such that the occurrence of mura can be reduced, and the display quality of the display device can be increased.

In some embodiments, as shown in FIGS. 1A-1D, the display layer 600 is such as a liquid crystal layer, and the first electrode layer 300 is such as a transparent electrode layer, for example, an ITO layer or a transparent conductive layer made of other metal oxide conductive materials. In some embodiments, the first electrode layer 300 is such as a common electrode.

In the embodiments, as shown in FIGS. 1A-1D, the display device may further include a sealant 700 and a plurality of spacers 800. The sealant 700 is disposed on the border region 120 and surrounds the display region 110 of the first substrate 100. The spacers 800 are disposed between the first substrate 100 and the second substrate 500.

In some embodiments, a height H of the spacers 800 is such as greater than or equal to 2 μm and less than or equal to 5 μm.

In some embodiments, a spacing between two adjacent of the spacers 800 in the border region 120 is such as greater than or equal to 25 μm and less than or equal to 500 μm.

In some embodiments, also referring to FIG. 2A, the spacers 800 have a first width P along an extending direction of the interface 100A between the display region 110 and the border region 120, the spacers 800 have a second width Q along a direction perpendicular to the extending direction of the interface 100A, the first width P and the second width Q are in units of micrometers (μm), and the values of the first width P and the second width Q of the spacers 800 in the border region 120 may satisfy the following condition: $0.1 \leq Q/P \leq 100$.

In the embodiments, the process of forming the first alignment layer 400 includes coating an alignment layer liquid material on the first substrate 100 and performing a baking step to form the first alignment layer 400. In the process of forming the first alignment layer 400, the 3D structures (e.g. the spacers) on the first substrate 100 may cause the liquid material to retain on the surfaces of the 3D structures and induce surface tension phenomenon, which may result in un-uniform thickness distribution of the coating layer of the alignment layer liquid material. According to the embodiments of the present disclosure, when the first width P and the second width Q of the spacers 800 satisfy the above condition of $0.1 \leq Q/P \leq 100$ and the spacing between two adjacent of the spacers 800 is greater than or equal to 25 μm and less than or equal to 500 μm, the ratio of two widths of the spacer 800 is limited within the above range, such that the surface tension phenomenon is reduced, the un-uniform thickness distribution phenomenon of the coating layer of the alignment layer liquid material caused by the 3D structures of the spacers 800 can be improved. Accordingly, the thickness uniformity of the as-formed first alignment layer 400 can be improved, and the display quality can be increased. The shape of the spacer 800 as shown in FIG. 2A is a top view shape as viewed from a top view perspective perpendicular to the substrate.

In one embodiment, as shown in FIG. 1A and FIG. 2A, the border region 120 may have a first zone 121, and the first zone 121 is defined as an area extending from the interface 100A between the display region 110 and the border region 120 towards the sealant 700 by 100 μm. As shown in FIG. 1A and FIG. 2A, the first zone 121 covers the area extending from the outer periphery (i.e. the interface 100A) of the display region 110 outwards by 100 μm, and surrounds the display region 110.

In the embodiments, the spacers 800 in the first zone 121 are such as conductive stoppers for preventing the shortcuts of conductive structures located above and below the spacers 800 as well as providing supports. However, the above is an example only, and the spacers 800 in the first zone 121 of the present application are not limited to be conductive stoppers.

In the embodiments, as shown in FIG. 2A, the first width P and the second width Q are in units of micrometers (μm), and the values of the first width P and the second width Q of the spacers 800 in the first zone 121 may satisfy the following condition: $0 < P/Q \leq 1$. In some embodiments, the first width P and the second width Q are in units of micrometers (μm), and the first width P and the second width Q of the spacers 800 in the first zone 121 may further satisfy the following condition: $0.01 \leq P/Q \leq 1$.

As previously described, the process of forming the first alignment layer 400 includes coating an alignment layer liquid material on the first substrate 100, and the liquid material retained on the surfaces of the 3D structures (e.g. the spacers) and the induced surface tension phenomenon may result in un-uniform thickness distribution of the coating layer of the alignment layer liquid material. As shown in FIG. 2A, since the first zone 121 is the most adjacent zone to the display region 110, when the applied amount of the coating liquid is fixed, the capillarity phenomenon caused by the 3D structures in the first zone 121 may cause an undesired increase of the liquid level of the coating liquid in the first zone 121, leaving an increased amount of the coating liquid retained in the first zone 121, inevitably resulting in a decrease of the amount of the coating liquid in the display region 110 which is adjacent to the first zone 121, such that an undesired decrease of the liquid level of the coating layer of the alignment layer liquid material in the display region 110 occurs. As such, not only the first alignment layer 400 in the border region 120 is facing the uniform thickness issue, but the first alignment layer 400 in the display region 110 is also provided with uniform thickness.

In contrast, according to the embodiments of the present disclosure, when the values of the first width P and the second width P of the spacers 800 in the first zone 121 are conformed to the condition of $0 < P/Q \leq 1$, or even are further conformed to the condition of $0.01 \leq P/Q \leq 1$, the shapes of the spacers 800 in the first zone 121 are close to circular forms, as shown in FIG. 2A; given that liquid surface tension force is inversely proportional to the liquid contact length between liquid and 3D structures, such that the spacers 800 conformed to the above conditions can provide a relatively large supporting area (i.e. the cross-sectional area 800a of the top portion of the spacer 800, as shown in FIG. 1E) while the relatively small liquid contact length can diminish the capillarity phenomenon occurred on the coating liquid and improve the issues of un-uniform thickness distribution of the coating layer of the alignment layer liquid material. As such, the coating liquid retained in the first zone 121 can be reduced, and the undesired decrease of the coating liquid in the display region 110 can be further reduced, and the predetermined thickness of the coating layer of the alignment layer liquid material in the display region 110 can be maintained. Accordingly, when the first width P and the second width Q of the spacers 800 in the first zone 121 are conformed to the above conditions, the thickness uniformity of the first alignment layer 400 in the display region 110 and the first zone 121 can be both improved, the occurrence of mum can be reduced, and the display quality of the display device can be increased.

In the embodiments, a spacing D1 between two adjacent of the spacers 800 in the first zone 121 is such as greater than or equal to 5 μm and less than or equal to 90 μm. Given that the distance between 3D structures is inversely proportional to the strength of capillarity phenomenon, according to the embodiments of the present disclosure, the spacing D1 between two adjacent of the spacers 800 in the first zone 121 is relatively small, the shapes of the spacers 800 are close to circular forms, and thus the capillarity phenomenon occurred on the coating liquid can be diminished, the issues of un-uniform thickness distribution of the coating layer of the alignment layer liquid material can be improved, and the thickness uniformity of the first alignment layer 400 can be increased.

In one embodiment, as shown in FIGS. 1A and 2A, the border region 120 may further have a second zone 123, and the second zone 123 is defined as an area extending from a location distanced from the interface 100A by 100 μm towards the sealant 700 and stopped at a location distanced from the interface 100A by 800 μm. In other words, the second zone 123 covers the area extending from the outer periphery of the first zone 121 towards the sealant 700 by 700 μm, and surrounds the display region 110 and the first zone 121.

In the embodiments, the spacers 800 in the second zone 123 are such as gap supports for providing supports. However, the above is an example only, and the spacers 800 in the second zone 123 of the present application are not limited to be gap supports.

In the embodiments, as shown in FIG. 2A, the spacers 800 in the second zone 123 are distanced from the interface 100A by a distance B (only one label of the distance B between one spacer 800 and the interface 100A is shown in drawings for exemplification), the first width P, the second width Q and the first distance B are in units of micrometers (μm), and the values (with no units) of the first width P, the second width Q and the first distance B are conformed to the following condition: $P/Q \leq (B-70)/30$, $100 < B \leq 800$.

For example, when the first width P and the second width Q of the spacers 800 are 100 μm and 6 μm respectively, P/Q=16.67. When the spacers 800 are disposed in the second zone 123 at a location distanced from the interface 100A by 161 μm, thereby (B−70)/30=(161−70)/30=3, and 3 is not greater than or equal to 16.67. Thus, according to the embodiments of the present disclosure, when the spacers 800 are disposed at a location distanced from the interface 100A by the distance B of 161 μm, the effects of the present disclosure cannot be achieved, and undesired influences of causing the thickness of the first alignment layer 400 to be un-uniform may occur. For example, when the spacers 800 are disposed in the second zone 123 at a location distanced from the interface 100A by 600 μm, thereby (B−70)/30=(600−70)/30=17.7, and 17.7 is greater than 16.67. Thus, according to the embodiments of the present disclosure, when the spacers 800 are disposed at a location distanced from the interface 100A by the distance B of 600 μm, the supporting effects can be achieved, and at the meantime the thickness uniformity of the first alignment layer 400 can be maintained. In other words, from the above two examples, it is apparent that the condition of P/Q≤(B−70)/30 is crucial in terms of providing the principles for designing the arrangement relationship between the shapes (P/C)) and the arranged positions (distance B) of the spacers 800; when the above condition is satisfied, the effects of the spacers 800 providing supports as well as the first alignment layer 400 having uniform thickness can be both achieved.

In the embodiments, a spacing D2 between two adjacent of the spacers 800 in the second zone 123 is such as greater than or equal to 5 μm and less than or equal to 600 μm.

In one embodiment, as shown in FIG. 1A, the border region 120 may further include a third zone 125, and the third zone 125 is defined as an area extending from an outer periphery of the second zone 123 to the sealant 700. In other words, the third zone 125 covers the area extending from the outer periphery of the second zone towards and stopped at the sealant 700, and surrounds the display region 110, the first zone 121 and the second zone 123.

In the embodiments, the spacers 800 in the third zone 125 are such as liquid barriers for preventing the coating liquid of the alignment layer to overflow towards regions outside the sealant 700. However, the above is an example only, and the spacers 800 in the third zone 125 are not limited to be liquid barriers. In addition, the first width P and the second width Q of the spacers 800 as well as the spacing between two adjacent of the spacers 800 in the third zone 125 may not be necessarily conformed to the conditions referring to the first zone 121 and/or the second zone 123 as aforementioned.

The arrangements of the first substrate 100, the color filter 200, the first electrode layer 300, the first alignment layer 400, the second substrate 500, the display layer 600, the sealant 700 and the spacers 800 as described in previous embodiments of the present disclosure may be applied in display devices of additional various embodiments.

In one embodiment, as shown in FIG. 1B, the display device 10-1 may further include a pixel electrode 910 disposed on the second substrate 500. The display device 10-1 may further include a second alignment layer 920 disposed on the pixel electrode 910. In the embodiment as shown in FIG. 1B, the first substrate 100 is such as a glass substrate, a plastic substrate or a substrate of other kinds; the second substrate 500 is such as a TFT substrate; the spacers 800 are disposed on the first substrate 100 and the color filter 200; the display device 10-1 is such as a VA type liquid crystal display device.

In an alternative embodiment, the display device 10-1 as shown in FIG. 1B may not include a second alignment layer 920 (not shown in drawings), and thus the display device 10-1 without a second alignment layer 920 is such as an IPS type liquid crystal display device or a FFS type liquid crystal display device.

In one embodiment, as shown in FIG. 1C, in the display device 10-2, the first substrate 100 is such as a glass substrate, the second substrate 500 is such as a TFT substrate, the spacers 800 are disposed on the second substrate (e.g. TFT substrate), and the display device 10-2 is such as a VA type liquid crystal display device. Likewise, the display device 10-2 without a second alignment layer 920 is such as an IPS type liquid crystal display device or a FFS type liquid crystal display device.

In one embodiment, as shown in FIG. 1D, in the display device 10-3, the first substrate 100 is such as a glass substrate, the second substrate 500 is such as a TFT substrate, the color filter 200 and the spacers 800 are all disposed on the second substrate (e.g. TFT substrate), and the display device 10-3 is such as a VA type liquid crystal display device. Likewise, the display device 10-3 without a second alignment layer 920 is such as an IPS type liquid crystal display device or a FFS type liquid crystal display device.

In the various embodiments as shown in FIGS. 1B-1D, the first electrode layer 300 may be presented in forms as shown in the drawings where the electrode patterns are in forms of multiple regions which are designed according to the masks; the first electrode layer 300 may as well be presented as a whole plane of electrode layer which extends to the edge of the encapsulation layer (not shown in drawings) without applying any masks.

While the disclosure has been described by way of example and in terms of the exemplary embodiment(s), it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A display device, comprising:
   a first substrate comprising a first surface with a normal direction and having a display region and a border region, wherein a first interface is defined as an interface located between the display region and the border region, a direction extending from the border region toward the display region is defined as a first direction, the first direction is perpendicular to the normal direction, a second direction is perpendicular to the normal direction, and the first direction is perpendicular to the second direction;
   a second substrate, wherein the first surface of the first substrate faces the second substrate;
   a color filter disposed corresponding to the display region, wherein the color filter comprises a plurality of first pixel regions and a plurality of second pixel regions staggeredly arranged, and the plurality of first pixel regions have a color different from that of the plurality of second pixel regions;
   a first electrode layer disposed on the first substrate;
   a first alignment layer disposed on the first electrode layer;
   a display layer disposed between the first substrate and the second substrate;

a sealant disposed on the border region and surrounding the display region; and a plurality of spacers disposed between the first substrate and the second substrate and disposed on the same substrate, wherein the border region has a second zone defined as an area extending from a location distanced from the first interface by 100 μm towards the sealant and stopping at a location distanced from the first interface by 800 μm, the plurality of spacers comprise a first spacer and a second spacer, the first spacer and the second spacer are not overlapped with the sealant along the normal direction and are located in the second zone, and the second spacer is farther away from the first interface than the first spacer; and wherein a ratio of a width P of the first spacer along the second direction to a width Q of the first spacer along the first direction is less than a ratio of a width P of the second spacer along the second direction to a width Q of the second spacer along the first direction, the width P of the second spacer along the second direction is greater than the width P of the first spacer along the second direction, and the width P of the second spacer along the second direction is greater than the width Q of the second spacer along the first direction.

2. The display device according to claim 1, wherein the first interface comprises a portion extending along the second direction; and wherein the border region has a first zone defined as an area extending from the portion of the first interface towards the sealant and the border region by 100 μm, one of the plurality of spacers located in the first zone has a first width P along the second direction, the one of the plurality of spacers located in the first zone has a second width Q along the first direction, units of the first width P and the second width Q are micrometers (μm), and the first width P and the second width Q of the one of the plurality of spacers located in the first zone are conformed to the following condition: 0<P/Q≤1.

3. The display device according to claim 2, wherein the first width P and the second width Q of the one of the plurality of spacers located in the first zone are conformed to the following condition: 0.01≤P/Q≤1.

4. The display device according to claim 2, wherein a first spacing between two adjacent of the plurality of spacers located in the first zone is greater than or equal to 5 μm and less than or equal to 90 μm.

5. The display device according to claim 2, wherein the plurality of spacers located in the first zone are conductive stoppers.

6. The display device according to claim 1, wherein the first interface comprises a portion extending along the second direction; and wherein one of the plurality of spacers located in the second zone has a first width P along the second direction, the one of the plurality of spacers located in the second zone has a second width Q along the first direction, the one of the plurality of spacers located in the second zone are distanced from the portion of the first interface by a first distance B, units of the first width P, the second width Q and the first distance B are micrometers (μm), and the first width P, the second width Q and the first distance B are conformed to the following condition: P/Q≤(B−70)/30, 100<B≤800.

7. The display device according to claim 6, wherein a second spacing between two adjacent of the plurality of spacers located in the second zone is greater than or equal to 5 μm and less than or equal to 600 μm.

8. The display device according to claim 6, wherein the plurality of spacers located in the second zone are gap supports.

9. The display device according to claim 6, wherein a size of one of the plurality of spacers located in a first zone that is defined as an area extending from the portion of the first interface towards the sealant and the border region by 100 μm is smaller than a size of one of the plurality of spacers located in the second zone.

10. The display device according to claim 1, wherein the border region further has a third zone defined as an area extending from an outer periphery of the second zone to the sealant.

11. The display device according to claim 10, wherein the plurality of spacers located in the third zone are liquid barriers.

12. The display device according to claim 1, wherein a height of one of the plurality of spacers is greater than or equal to 2 μm and less than or equal to 5 μm.

13. The display device according to claim 1, wherein a third spacing between two adjacent of the plurality of spacers in the border region is greater than or equal to 25 μm and less than or equal to 500 μm.

14. The display device according to claim 1, wherein one of the plurality of spacers has a first width P along the second direction, the one of the plurality of spacers has a second width Q along the first direction, units of the first width P and the second width Q are micrometers (μm), and the first width P and the second width Q of the one of the plurality of spacers in the border region are conformed to the following condition: 0.1≤Q/P≤100.

15. The display device according to claim 1, wherein sizes of the plurality of spacers are different.

16. The display device according to claim 1, further comprising:

a pixel electrode disposed on the second substrate; and
a second alignment layer disposed on the pixel electrode.

17. The display device according to claim 1, wherein the first electrode layer is a common electrode.

18. The display device according to claim 1, further comprising a backlight module disposed corresponding to the first substrate.

* * * * *